United States Patent
Liu

(10) Patent No.: US 6,709,278 B2
(45) Date of Patent: Mar. 23, 2004

(54) PERSONAL DIGITAL ASSISTANT WITH A FOLDABLE MEMORY CARD ADAPTER

(75) Inventor: Ying-Jen Liu, Hsinchuang (TW)

(73) Assignee: Unication Co., Ltd., Taipei Hsien (TW)

( * ) Notice: Subject to any disclaimer, the term of this patent is extended or adjusted under 35 U.S.C. 154(b) by 0 days.

(21) Appl. No.: 10/102,775

(22) Filed: Mar. 21, 2002

(65) Prior Publication Data

US 2003/0181074 A1 Sep. 25, 2003

(51) Int. Cl.[7] ............................................. H01R 12/00
(52) U.S. Cl. ........................ 439/67; 439/446; 439/165
(58) Field of Search .......................... 439/31, 67, 165, 439/446, 492

(56) References Cited

U.S. PATENT DOCUMENTS

| | | | | |
|---|---|---|---|---|
| 5,521,369 A | * | 5/1996 | Kumar | 235/472.01 |
| 5,712,760 A | * | 1/1998 | Coulon et al. | 361/680 |
| 6,222,726 B1 | * | 4/2001 | Cha | 361/683 |
| 6,530,792 B2 | * | 3/2003 | Lai et al. | 439/165 |
| 6,547,463 B1 | * | 4/2003 | Loo | 400/472 |
| 2002/0030965 A1 | * | 3/2002 | Katz | 361/680 |
| 2002/0191999 A1 | * | 12/2002 | Katz | 400/472 |

OTHER PUBLICATIONS

The American Heritage Dictionary of the English Language, Third Edition copyright 1992 by Houghton Mifflin Company. Electronic version licensed from INSO Corporation.*

* cited by examiner

Primary Examiner—Tho D. Ta
Assistant Examiner—James R. Harvey
(74) Attorney, Agent, or Firm—Alan Kamrath

(57) ABSTRACT

A personal digital assistant (PDA) with a foldable memory card adapter has a PDA and a memory card adapter. The PDA is formed with a connecting slot in one edge of the PDA. The memory card adapter is connected to the PDA by a slide connector on an end a signal bus made of flexible material. When the card adapter is attached to the PDA, the slide connector is linked to the connecting port, whereby the memory card adapter can be folded to overlap the rear of the PDA. Thus the entire size of the PDA device is reduced and convenient to carry.

3 Claims, 4 Drawing Sheets

PERSONAL DIGITAL ASSISTANT WITH A FOLDABLE MEMORY CARD ADAPTER

BACKGROUND OF THE INVENTION

1. Field of Invention

The present invention relates to a personal digital assistant (PDA), and more particularly to a PDA with a memory card adapter that can be folded to overlap the rear of the PDA.

2. Related Art

Portable information appliances, such as MP3 players, digital cameras and PDAs, are popularly with consumers. To encourage consumers to purchase information appliances, the information appliances are designed to be multi-function devices. However, the size of the product usually increases when multiple functions are integrated into an apparatus because of the complexity of the design of the circuitry.

For example, since each of the information appliances mentioned has its own particular data accessing specification, data storage media (memory cards) for information products have been correspondingly developed to multiple standards. The present memory card specifications generally comprise the Compact flash card (CF card), Smart Media card (SM card), Multimedia card (MMC), Security digital card (SD card), Memory Stick, etc. The information appliance or personal computer must be equipped with several slots to access different cards.

The PDA has become the most popular apparatus with the majority of consumers because of its small size, multi-function data processing, large storing capacity, etc. One way for a PDA device to read and write to different types of memory cards is to build multiple slots in the PDA to receive corresponding memory cards. However, such a solution will cause the size of the PDA to increase and cause the PDA to become inconvenient to carry. Therefore, a compromise PDA design only has two slots to access two kinds of memory cards, but this design approach limits the expandability of the PDA.

To overcome the shortcomings, the present invention provides a PDA having a foldable memory card adapter to mitigate and obviate the aforementioned problems.

SUMMARY OF THE INVENTION

A primary objective of the PDA with a foldable memory card adapter in accordance with the present invention is to reduce the size of the entire PDA device.

A secondary objective of the PDA with a foldable memory card adapter in accordance with the present invention is to provide a PDA device that can access different types of memory cards.

To achieve the objectives, the present invention comprises a PDA formed with a connecting slot, a flat card adapter having a signal bus connected to the connecting slot in the PDA, wherein the flat card adapter can be folded to overlap the rear surface of the PDA.

Other objects, advantages and novel features of the invention will become more apparent from the following detailed description when taken in conjunction with the accompanying drawings.

DETAILED DESCRIPTION OF THE INVENTION

Figure 1:
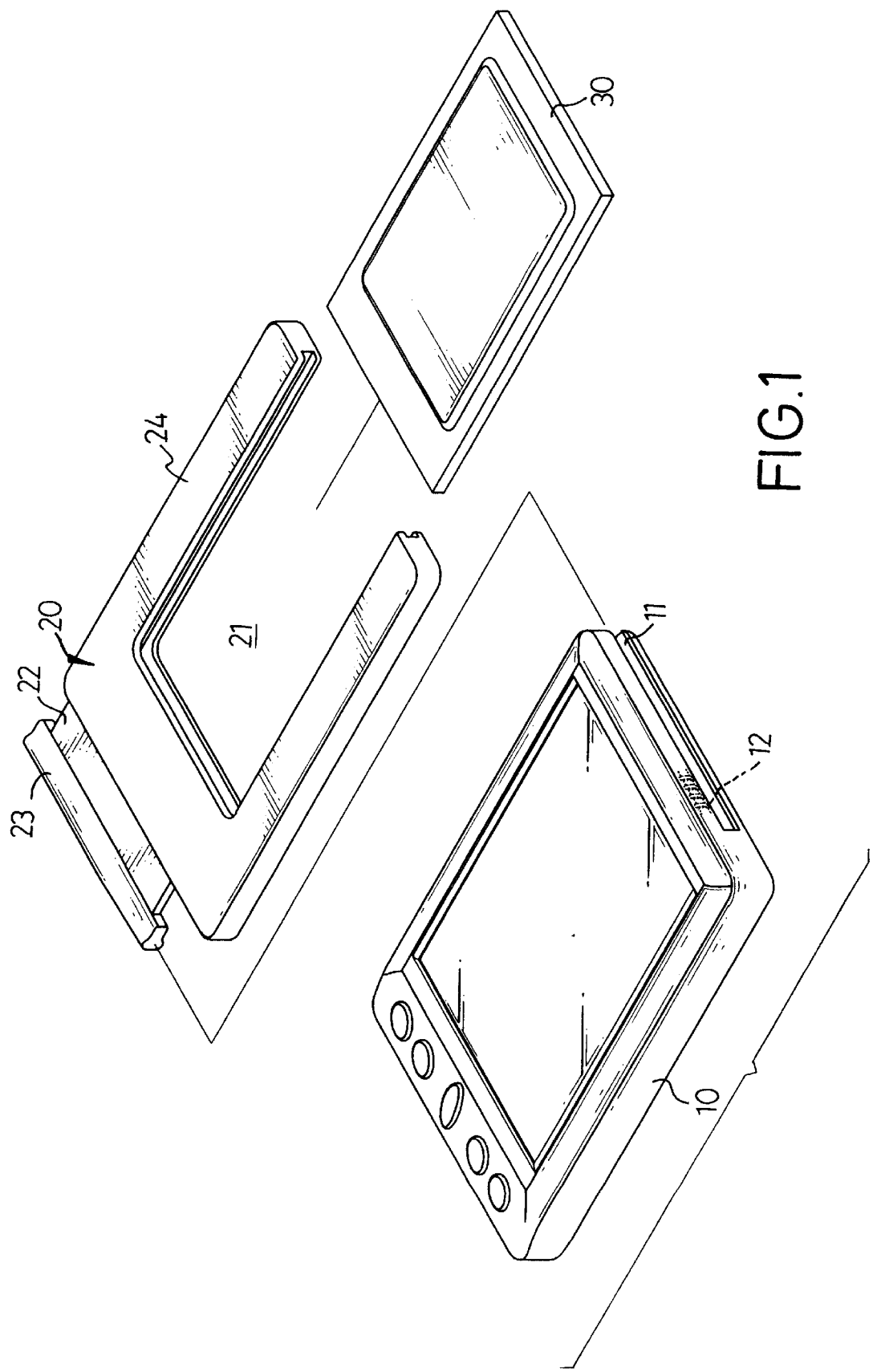
FIG. 1 is an exploded perspective view of a PDA with a foldable memory card adapter in accordance with the present invention.
Figure 2:
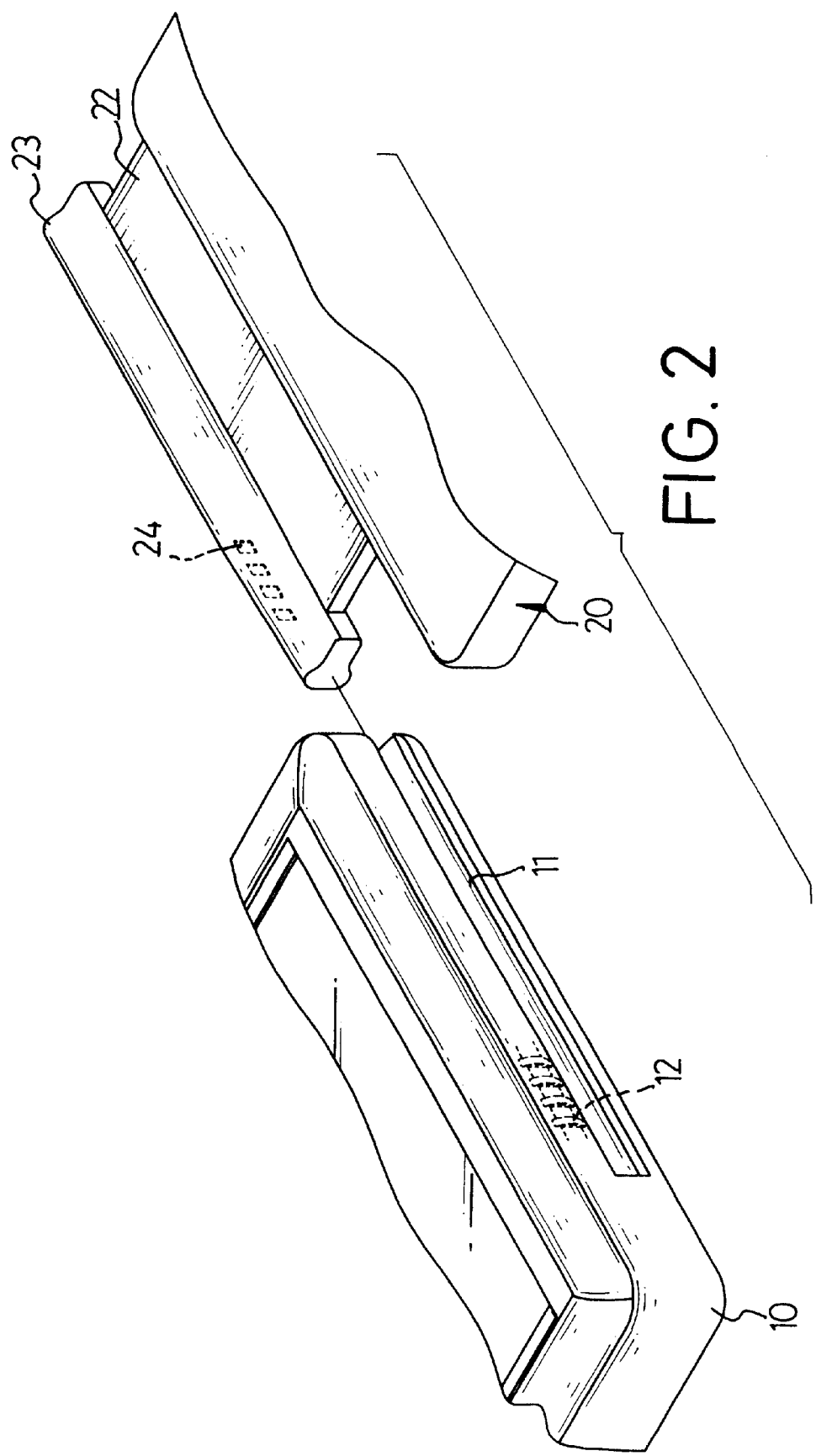
FIG. 2 is an enlarged perspective view of the PDA the foldable memory card adapter in FIG. 1 linked to the PDA.

With reference to FIGS. 1 and 2, a PDA (10) with a foldable memory card adapter (20) in accordance with the present invention comprises a PDA (10) and a foldable memory card adapter (20). The PDA (10) is adapted to connect the foldable memory card adapter (20) to the PDA (10), and a memory card (30) is detachably mounted in the foldable memory card adapter (20).

The PDA (10) has a front surface (not numbered), a rear surface(not numbered), flat edges (not numbered) between the front and rear surfaces, a connecting slot (11) and multiple conductive contacts (12). The connecting slot (11) is formed in one edge of the PDA (10). An open end (not numbered) is defined in the connecting slot (11) into which the card adapter (20) is inserted. The conductive contacts (12) are arranged inside the connecting slot (11). Each conductive contact (12) is made from a thin and substantially arcuate metal plate.

The memory card adapter (20) comprises a memory card holder (24), a signal bus (22) and a slide connector (23). A preferred embodiment of the memory card adapter (20) would be the same size as or slightly smaller than the PDA (10) so they can be conveniently carried as a connected unit. However, the memory card adapter (20) in other embodiments could be slightly or significantly larger than the PDA (10) without causing undue inconvenience in carrying the PDA (10) since the memory card adapter (20) can be detached and carried separately.

The memory card holder (24) is essentially U-shaped with an open end, a closed end and two sides, a U-shaped card receiving slot (21) is formed in the memory card holder (24) to hold the memory card (30) and link the memory card (30) to the signal bus (22). The signal bus (22) is made of flexible material, has two ends and extends from the closed end or a side of the card holder (24). The slide connector (23) is further formed at a free end of the signal bus (22) to link the signal bus (22) and the memory card (30) to the connecting slot (11). The shape of the slide connector (23) corresponds to the shape of the connecting slot (11) to securely hold the slide connector (23) in the connecting slot (11). Multiple conductive pads (24) are mounted in the slide connector (23) to correspond to and electrically contact the conductive contacts (12) inside the connecting slot (11).

Figure 3:
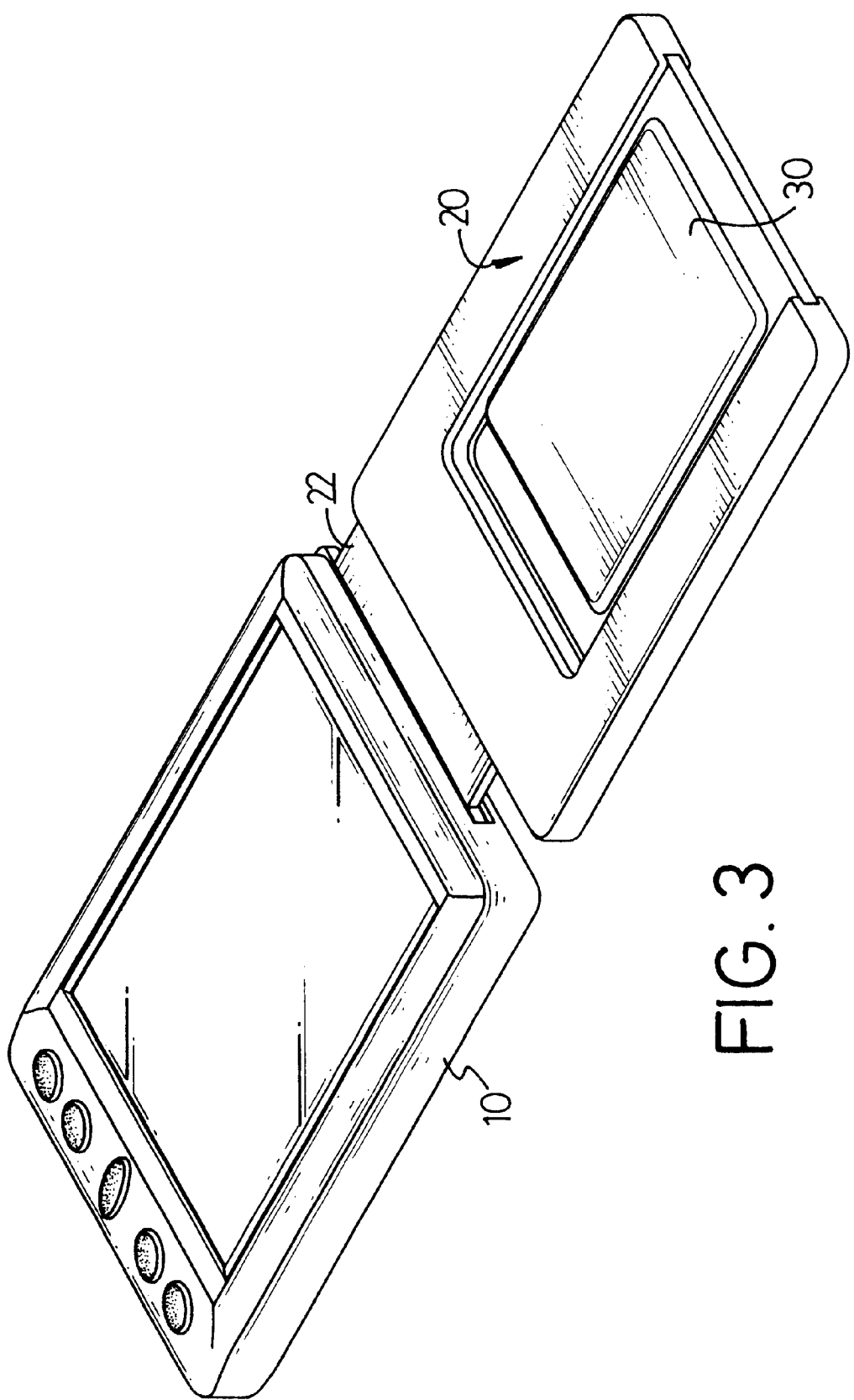
FIG. 3 is a perspective view of the PDA with a foldable memory card adapter in FIG. 1 with the foldable memory card adapter connected to the PDA.

With reference to FIGS. 2 and 3, to assemble the PDA (10) and the adapter (20) together, the slide connector (23) is slid into the connecting slot (11) through the open end of the connecting slot (11). Thus each conductive pad (24) contacts the corresponding conductive contact (12).

Figure 4:
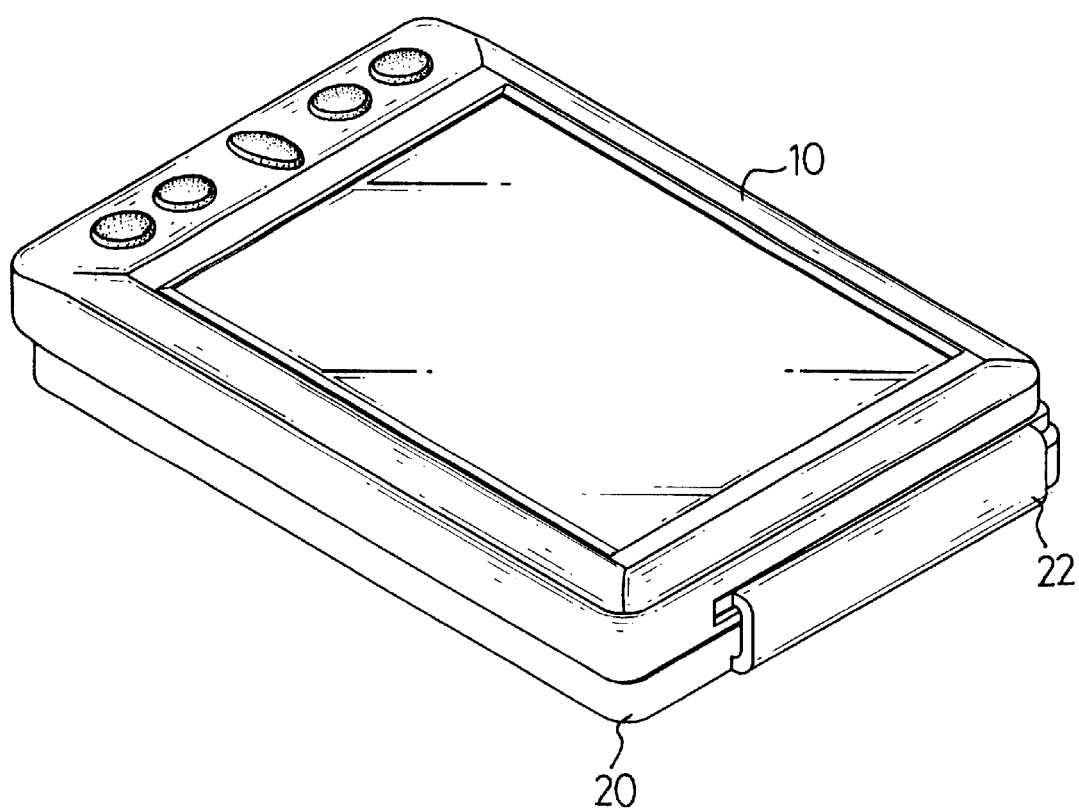
FIG. 4 is a perspective view of the PDA in FIG. 3 with the foldable memory card adapter folded to overlap the rear surface of the PDA.

With reference to FIG. 4, after the memory card adapter (20) is linked to the PDA (10) and the memory card (30) is inserted into the card receiving slot (21), the memory card adapter (20) can be folded to overlap the rear surface of the PDA (10) since the signal bus (22) is made of flexible material. With the memory card adapter (20) folded against the rear surface of the PDA(10), the entire PDA device does not occupy mush space and is convenient to carry.

Furthermore, instead of the multiple built-in slots to receive different types of memory cards, the PDA device employs different types of replaceable memory card adapters (20) to access different types of memory cards. Thus the size of the PDA (10) is also greatly reduced. Depending on a user's specific requirements, the user can choose a memory card adapter (20) with the applicable interface to read and write to a particular type of memory card (30).

Besides accessing the memory card (30), the memory card adapter (20) can also be used to attach a rechargeable flat battery (not shown) to the PDA (10). When the power inside the PDA (10) has been dissipated, a rechargeable flat battery can be inserted into the memory card adapter (20) to provide a temporary source of power.

From the foregoing description of the embodiment, the PDA device in accordance with the present invention has advantages over the prior art that include the following.

1. Small size: Since the memory card adapter is flat, and the memory card adapter has a flexible signal bus, the memory card adapter can be easily folded to overlap the rear surface of the PDA, whereby the entire size of the PDA device can be reduced.

2. Suitable for different memory cards: The memory card adapter can be replaced depending on the type of memory card the user requires.

3. Provide a temporary power supply: The memory card adapter can hold a flat rechargeable battery to provide a temporary source of power to the PDA.

The invention may be varied in many ways by a skilled person in the art. Such variations are not to be regarded as a departure from the spirit and scope of the invention, and all such modifications are intended to be included within the scope of the following claims.

What is claimed is:

1. A personal digital assistant (PDA) with a foldable memory card adapter comprising:
   a PDA with a front surface, a rear surface, flat edges and a connecting port formed in one edge; and
   a card adapter comprised of a card holder, a signal bus and a slide connector, which is electrically linked to the connecting port of the PDA via the signal bus that is made of flexible material;
   wherein the signal bus has a first end electrically connected to the card adapter and a second end connected to the slide connector to link the signal bus to the connecting port of the PDA;
   wherein the slide connector is shaped to correspond to the connecting port to securely hold the slide connector in the connecting port and when the card adapter is mechanically linked to the PDA, the card adapter can be folded to overlap a rear surface of the PDA.

2. The PDA with a foldable memory card adapter as claimed in claim 1, wherein the connecting port of the PDA is defined with an open end to allow the slide connector to be slid into the connecting port.

3. The PDA with a foldable memory card adapter as claimed in claim 2, wherein multiple conductive contacts are arranged inside the connecting port, and multiple conductive pads respectively corresponding to the multiple conductive contacts are formed inside the slide connector, wherein each conductive contact is formed as a substantially arcuate plate.

* * * * *